MULTIPLE TONE TRANSMITTER

INVENTORS
ABRAHAM BROTHMAN
RICHARD D. REISER
STEPHEN J. HALPERN
ELSA BROTHMAN
BY
OSTROLENK, FABER, GERB & SOFFEN
ATTORNEYS

INVENTORS
ABRAHAM BROTHMAN
RICHARD D. REISER
STEPHEN J. HALPERN
ELSA BROTHMAN
BY
OSTROLENK, FABER, GERB & SOFFEN
ATTORNEYS

MULTIPLE TONE TRANSMITTER

Filed Dec. 27, 1961 4 Sheets-Sheet 3

INVENTORS
ABRAHAM BROTHMAN
RICHARD D. REISER
STEPHEN J. HALPERN
ELSA BROTHMAN

BY

OSTROLENK, FABER, GERB & SOFFEN
ATTORNEYS

INVENTORS
ABRAHAM BROTHMAN
RICHARD D. REISER
STEPHEN J. HALPERN
ELSA BROTHMAN
BY
OSTROLENK, FABER, GERB & SOFFEN
ATTORNEYS

United States Patent Office 3,196,213
Patented July 20, 1965

3,196,213
MULTIPLE TONE TRANSMITTER

Abraham Brothman, Dumont, and Richard D. Reiser, Newark, N.J., Stephen J. Halpern, Forest Hills, N.Y., and Elsa Brothman, Dumont, N.J., assignors to Transitel International Corporation, Paramus, N.J., a corporation of New Jersey Filed Dec. 27, 1961, Ser. No. 162,337
13 Claims. (Cl. 179—3)

This invention relates to transmitting means and more particularly to novel transmitting means for generating a multiplicity of transmitting frequencies which serve as a synchronizing means and wherein the presence and absence of the various tones represent the coded intelligence.

Data transmitting systems which are presently in widespread use normally consist of electronic communications equipment at positions remote from one another, which equipment is able to transmit coded intelligence to a remote calling location in response to a transmission request signal from that remote location. Transmission systems of this type find widespread use in a variety of applications such as, for example, branch office to central office inventory systems; branch office to central office bookkeeping systems; train, plane and hotel reservation systems and automated meter reading systems, to name just a few. In arrangements of this type, one location which is designated as the central office or central exchange is set up to gather encoded data from the remote locations in the data transmission network and to conduct its own activities in response to the data gathered. For example, the inventory systems, the central location, in response to the data which it has gathered, makes decisions regarding which remote locations may require replenishing of their inventories and which warehouse or warehouses are best suited to replenish inventories of the remote locations having depleted inventory stocks. As another example, in the meter reading system, such as the system set forth in U.S. application, U.S. Serial No. 91,043, filed February 23, 1961, now U.S. Patent No. 3,142,726, in the names of Abraham Brothman and Richard David Reiser, entitled "Automated Meter Reading System" and assigned to the assignee of the instant invention, the central office, in response to the received meter readings, compiles and prepares bills for the subscribers in the network. The application of such communications equipment is unlimited since such equipment may be employed in any type of situation which requires transmission of intelligence from one location to another.

Communication systems of this general type usually consist of a vast network which includes a large amount of remote transmitters responsive to a central receiving facility. The data transmitters utilized at the remote locations of such a network must be able to transmit data to the central location at a reasonably rapid rate and must initiate transmission automatically upon a transmission request signal imposed upon it by the central office facility. Networks of the general type set forth above because of their size require reliable transmission equipment which is capable of transmitting data accurately and which may operate reliably for long periods of time without necessity for maintenance.

In systems having a large number of locations within the network, transmission between the central location and the remote locations is performed on a time sharing basis. It is desirable, therefore, to effect transmission in short periods of time so that a larger number of remote locations may communicate with the central location per unit time. For this reason, it is desirable that the transmitters at the remote locations become energized only upon the receipt of a transmission request signal and upon such energization are capable of transmitting the data accurately and at a rapid rate. Since the transmitter need be energized only during the transmission period, a monitoring facility must be provided for automatically energizing the transmitter in response to the transmission request signal. The communication medium may be an RF carrier or may consist of conductors such as standard telephone wires. In systems using existing telephone lines as a communication medium, the ringing facility of the telephone hand set is normally energized by either a sinusoidal or square wave type wave form of a specified frequency. The line monitoring circuitry of the transmitter at the subscriber location is so arranged as to recognize the transmission request signal which is a step voltage having a larger amplitude and pulse direction than the ring initiating signals. The line monitoring circuit is further arranged to accomplish the recognition of the transmit request signal without loading the line.

A system having such characteristics therefore requires transmission equipment which is enabled to operate at reasonably high speeds. In high speed operating systems of this type, it is therefore necessary to accurately synchronize receiving equipment at the central location with the transmitting equipment at each remote location in order to insure the reliability of the intelligence being transmitted.

Many such systems presently in use employ synchronous motors at both the remote and central locations so as to synchronize the transmitter at the remote location with the receiving equipment at the central location. Synchronizing systems of this type are very difficult to maintain since voltage variations at local supply sources may have considerably large effects upon the system. Also, it is quite difficult to produce synchronous motors which are identical twins, that is, which operate in exact synchronism with each other even when energized by closely controlled energy sources. Manufacture of such high quality systems becomes an extremely expensive undertaking.

Another manner in which the synchronizing problem may be overcome is set forth in U.S. pending application Serial No. 126,278, filed July 24, 1961, entitled "Data Transmitter" in the names of Abraham Brothman et al. and assigned to the assignee of the instant invention. In this particular type of transmitter the synchronizing function is performed by a means which generates a synchronizing wave form having a train of pulses of equal amplitude which are interspersed with the binary intelligence pulses. The arrangement is such that the presence of an intelligence pulse between two synchronizing pulses denotes a binary "1," whereas the absence of an intelligence pulse between two synchronizing pulses denotes a binary "0." This arrangement is highly advantageous when employed in combination with a receiving facility comprised of a shift register arrangement of the type set forth in U.S. application Serial No. 91,043 as recited above. This arrangement employs the synchronizing pulses as shift pulses for the register while the data pulses are employed to "condition" the state of the shift register positions so that the state of the shift register, after an entire encoded character has been shifted therein, contains the binary coded representation of the character transmitted by the data transmitter.

The present invention completely avoids the need of separate synchronizing means by introducing a single tone generating means which is capable of generating a predetermined plurality of tones or frequencies wherein each tone represents a specified bit position of a binary coded alphanumeric character.

Our novel multiple tone transmitter is comprised of a motor-driven rotating arm having a plurality of sensing members or "fingers" adapted to engage a plurality of electrical contacts through one complete circular sweep of the arm. The conductive segments are arranged in a plurality of circular arrays which are positioned to be engageable with the associated sensing members of the rotatable arm. A first array includes a plurality of segments for receiving an associated binary input signal. A second array cooperates with the first array by means of the rotary arm which electrically connects the first array segments to the second array segments in a serial manner for impressing each of the binary signals in a sequential or serial fashion upon the control input terminal of the tone generator which is electrically connected to the second array circular segment. A third array includes a plurality of conductive segments which are connected to one of an associated plurality of impedance means included in the tone generator means. A fourth array includes a plurality of segments which are connected to associated alphanumeric to binary character encoding means. A fifth array is so arranged to cooperate with the third and fourth arrays by impressing a predetermined voltage potential upon the third and fourth array through the associated rotary arm sensing members so as to sequentially "condition" the tone generator to transmit the frequency developed by the impedance connected to the associated segment of the third array which is in engagement with the rotary sensing member at that instant.

The tone generator includes a single solid state amplifying means comprising said aforementioned impedance means which are sequentially inserted into the tone generator circuitry to change the output frequency thereof. The single solid state amplifying means is designed so as to perform three functions concurrently wherein these functions are the generation of the proper output frequency, controlling the presence or absence of that frequency to represent the binary state of the transmitted binary bit position and impressing the signal of proper frequency upon the communication medium without loading the medium by providing a proper impedance match between the tone generator input and output.

The tone generator is further adapted to generate an answer back tone which apprises the receiver that the transmission request signal has been received and the transmitter has been energized accordingly. The frequency of the answerback signal further apprises the receiving equipment of the transmission duration required by the transmitter. An end of character tone is provided which conditions the receiving equipment for the subsequent character.

A distinct advantage of the tone generator transmitter lies in the fact that its design permits selection of a broad band of various tone frequencies so as to avoid conflict with other assigned frequency bands. For example, the multiple tone generator of our invention may be readily adapted for use in an automated meter reading system such as the meter reading system set forth in aforementioned U.S. application Serial No. 91,043. A meter reading system of the type therein set forth transmits utility meter readings in binary coded form to a central location by means of piggy-backing the meter reading system to the existing telephone networks. Although the normal frequency band for transmitting audio intelligence through the telephone network lies between 200 and 2800 cycles per second, so that the tones generated by the multiple generator lie within this range, the tones do not interfere with normal telephone usage.

Proper frequency adjustment of the tone generator, therefore, simply involves selection of the proper lumped parameters for the multiple impedance means included in the multiple tone generator circuit. Since the meter reading system is subservient in its importance with respect to the primary use of the telephone network, namely, transmission of intelligence between subscribers as opposed to transmission of meter readings, if for any reason the audio band-width is increased in the future or if the audio band-width is impressed upon a carrier for transmission through the telephone network, the tone generator is sufficiently flexible in its design so that the tones or frequencies which it is designed to generate may be simply and easily changed in order to avoid conflict with an occupied band-width having priority over the automatic meter reading facility.

A second advantage of the tone generator arrangement lies in the fact that the utilization of a plurality of tones completely avoids the necessity for highly accurate synchronizing means of the nature described in aforementioned U.S. pending applications Serial No. 91,043 and Serial No. 126,278, wherein rather elaborate synchronizing means are employed. By employing a plurality of tones as set forth in the instant application, a separate receiver or wave-filter means may be set up at the receiving end of a communication system for the receipt of each specified frequency. With this arrangement, plus an additional tone which is utilized for the recognition of an end-of-character, no synchronization problems arise.

Further means included within the transmitter are provided to energize the data transmitter only in response to a transmission request signal emanating from the central location equipment. Deenergizing means act to deactivate the data transmitter in response to one complete rotation of the rotating arm. The deenergizing means may, however, be modified so as to permit a plurality of 360° sweeps by the rotating arm to take place. The deenergizing means also includes means to prevent the rotary arm from assuming any position other than the zero degrees or starting position for the subsequent sweep upon completion of the present 360° sweep, thus avoiding the possibility of transmitting only a portion of the 360° sweep which the data transmitter traverses.

In applications wherein the data transmitter is employed to serialize encoded data received from a bank of analogue-to-digital encoders, such as for example, shaft angle encoders of the type which are fully described in U.S. pending application Serial No. 125,247, filed July 19, 1961 in the name of A. Brothman et al. and assigned to the assignee of the instant invention, entitled "Code Stack," switching means are provided which are incorporated in our novel transmitter structure for selectively energizing only one such encoder at any instant of time, thus permitting a large saving in the total number of connecting leads between the encoder outputs and the transmitter input terminals.

It is, therefore, one object of our invention to provide a transmitter for a communication system having a multiple tone synchronizing arrangement.

Another object of our invention is to provide a data transmitter having a novel monitoring arrangement for energizing the transmitter upon the occurrence of a transmission request signal, and for deenergizing the transmitter upon the termination of the message transmission.

Another object of our invention is to provide a data transmitter providing a novel multiple tone generator which is controlled by binary intelligence signals for encoding data through modulation of the multiple tones.

Still another object of our invention is to provide a data transmitter having novel means for transmitting an answer-back signal in response to a transmit-request signal wherein the answer-back signal apprises the receiver facility of the receipt of the transmit-request signal by the data transmitter and of the transmitting time required by the data transmiter for transmission of its message.

Still another object of our invention is to provide a data-transmitter for use in existing telephone networks wherein a novel selective ringing circuit is employed which is responsive to a transmit-request signal which is adapted so as not to initiate the ringing of the telephone hand set.

Still another object of our invention is to provide a data transmitter for transmitting data encoded by a plurality of analog-to-digital encoders which have their outputs connected in parallel having novel means for sequentially energizing the encoders on a one-by-one basis.

Still another object of our invention is to provide a data transmitter having a novel multiple tone generator consisting of a single stage amplifier means.

These and other objects of our invention will become apparent from the following description when taken in connection with the drawings in which:

FIGURE 1*a* is a schematic of the transmission portion of our novel data transmitter.

FIGURE 1*b* is a schematic diagram of the tone generator of our novel data transmitter.

FIGURE 1*c* is a side plan view of the rotary arm employed in the data transmitter of FIGURES 1*a* and 1*b*.

FIGURE 1*d* is a cross-sectional view of the rotary arm of FIGURE 1*c* taken along the line 1*d*–1*d'*.

Figure 1A:
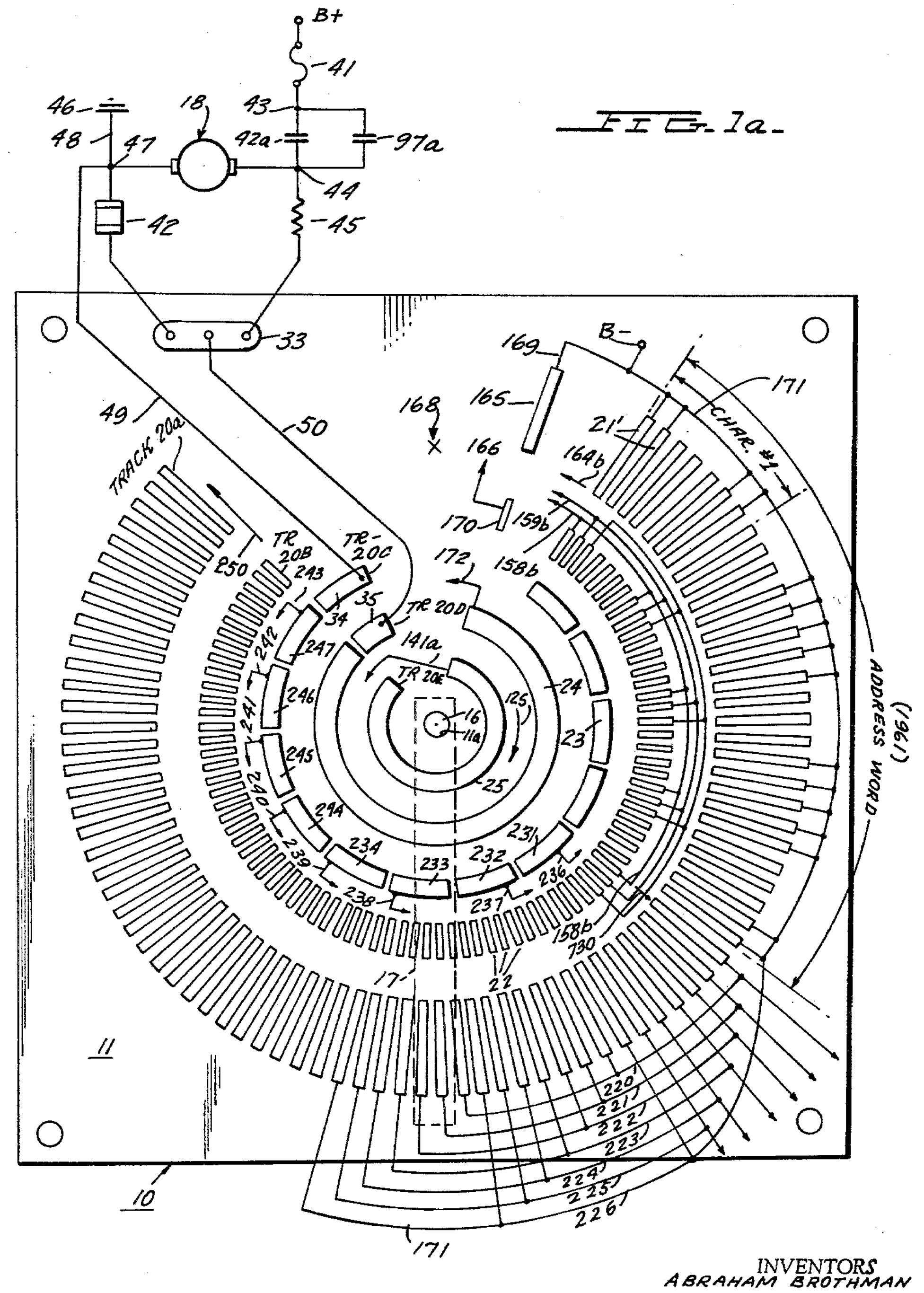

Referring now to the drawings. FIGURE 1*a* is a schematic diagram of the transmission portion of our data transmitter wherein the transmission portion is comprised of a printed circuit board 11 which is provided with an aperture 11*a* through which a shaft 16 is passed. The shaft 16 is rotated by motor 18, as will be more fully described. Rotary arm 17 is rigidly secured to shaft 16, which shaft is inserted through aperture 60 of the rotary arm by means of set screw 65*a*. Rotary arm 17 has five conductor fingers 19*a* through 19*e*, respectively (see FIGURE 1*c*).

Shaft 16 rotates about its own longitudinal axis causing sensing fingers 19*a* through 19*e* to sequentially engage the associated track segments of tracks 20*a* through 20*e*, respectively.

Tracks 20*a* and 20*b* of printed circuit 11 each consist of a plurality of radially aligned segments 21 and 22, respectively, wherein the number of segments 21 is equal to the number of segments 22 for a reason to be more fully described.

Track 20*c* consists of a plurality of arcuate segments 23 which cooperate with the sensing member 19*c* of rotary arm 17. Arcuate segments 34 and 35 which are located in tracks 20*c* and 20*d*, respectively, cooperate with sensing members 19*c* and 19*d* for deenergizing the transmitter upon the completion of transmission, as will be more fully described.

Tracks 20*d* and 20*e* each consist of arcuate segments 24 and 25, respectively, wherein the segment 25 is electrically connected to the transmitter tone generator, while the segment 24 is electrically connected to a D.-C. bias having a predetermined potential voltage level for purposes to be more fully described.

Each rotary arm sensing finger 19*a* through 19*e* (see FIGURES 1*c* and 1*d*) is bent at its lower end 26, which ends are appropriately positioned to make electrical contact with the circular conductive members of their respective tracks.

Rotary arm 17 is formed of insulating material such as plastic, and is machined so as to form apertures 60 through 64, which are provided for the insertion of sensing members 19*a* through 19*e*, respectively. The upper portion 65 through 69 of apertures 60 through 64, respectively, becomes abruptly wider to accommodate set screws 70 through 74 which serve the dual function of securing an associated nut 75 through 79, respectively, to arm 17, and for adjusting the vertical positioning of the associated sensing members 19*a* through 19*e*, respectively, in order to maintain the necessary contact pressure between the sensing member and its associated conductive segment on printed circuit board 11.

Figure 1B:
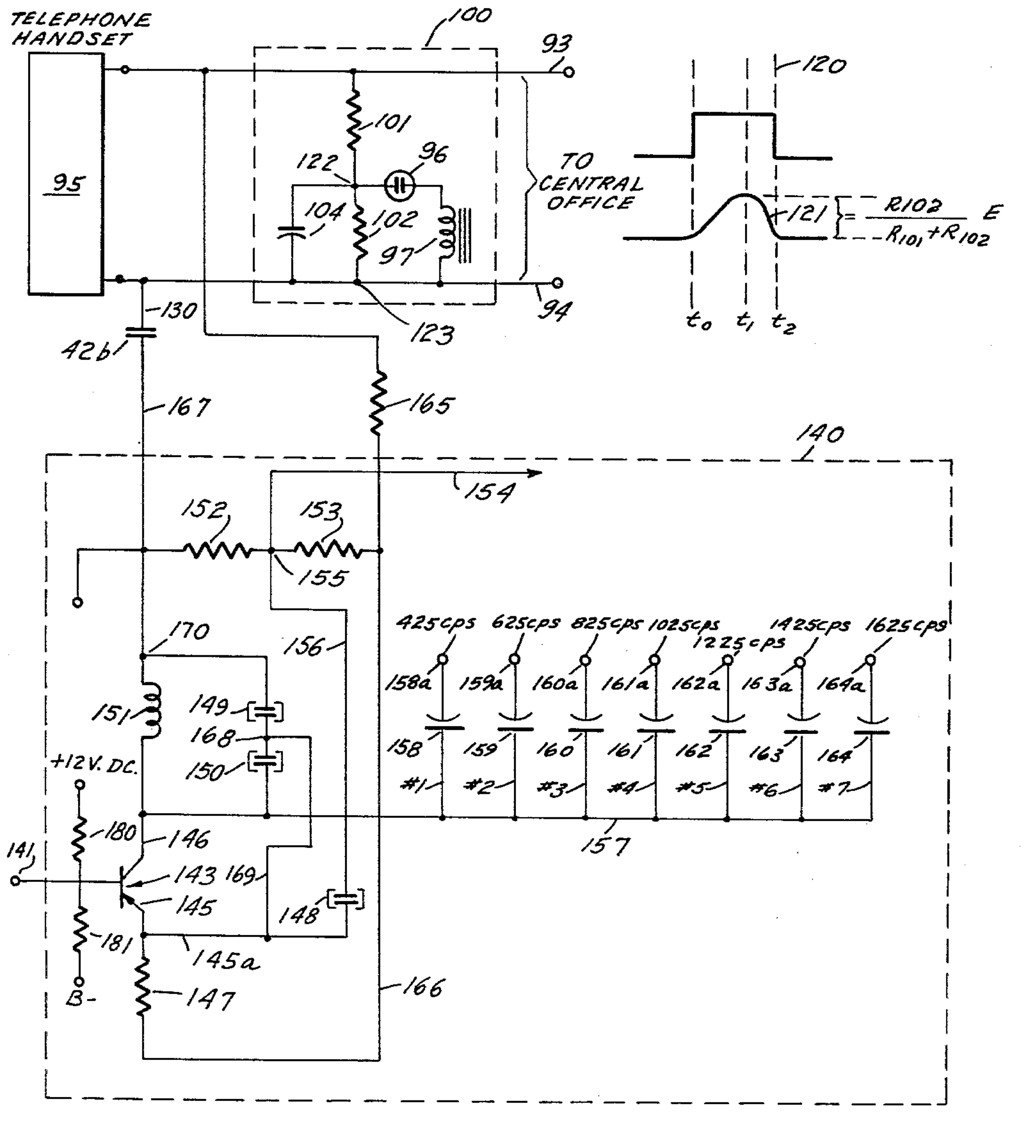
Figure 1C:
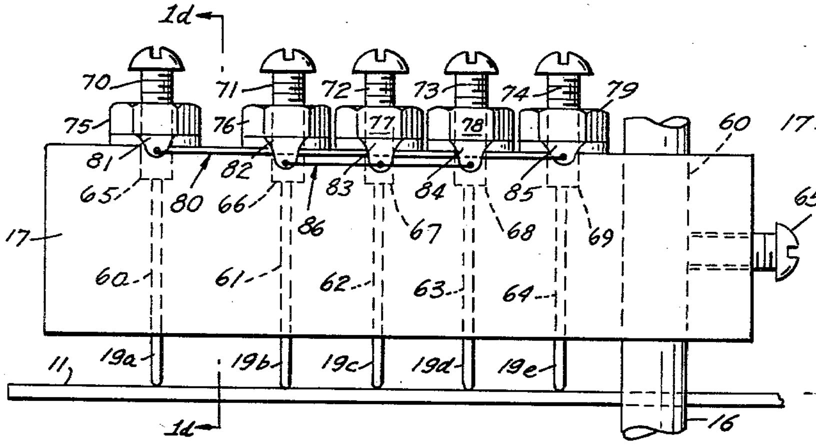
Figure 1D:
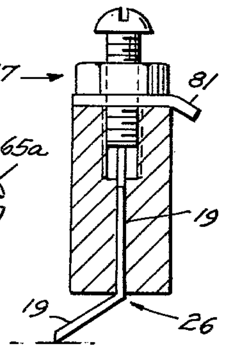

A plurality of lug members 81 through 85 are each mounted between their associated nuts 75 through 79 and rotary arm member 17 so that a conductive path exists between each sensing member such as, for example, member 19*a*, screw 70 and lug 81 which can best be seen in FIGURE 1*d*. Lugs 81 and 85 are electrically connected by means of conductor 80 to establish a conductive path between sensing member 19*a* and sensing member 19*e* for a purpose to be more fully described. A conductor 86 is provided to electrically connect lugs 82, 83, and 84 for the purpose of establishing a conductive path between sensing members 19*b*, 19*c*, and 19*d* for a purpose to be more fully described.

The set screws 70 through 74 are adapted to provide contact pressure which is sufficient to establish a conductive path between each sensing member 19*a* through 19*e* and the track segments of tracks 20*a* through 20*e*, respectively, throughout the rotation of rotary arm 17.

One method of utilizing data transmitter 10 is shown in FIGURE 1*b* wherein the data transmitter is electrically connected to the incoming lines 93 and 94 of a telephone network, which lines also lead to the telephone of the subscriber which is shown schematically as numeral 95. It should be understood, however, that the data transmitter 10 is not limited in use to telephone networks alone, but may be utilized in other communication networks such as networks which employ electromagnetic wave propagation as the communication medium. Also, transmission may be arranged to take place through other conductor systems such as through utility company power lines, or through telephone lines, to name just a few examples.

Since it is already understood that data transmitter 10 operates on an intermittent time-sharing basis with all other data transmitters, it is, therefore, neither necessary nor economical to have transmitter 10 in an energized state at all times. For this reason, we provide a selective ringing circuit 100 which is so arranged as to energize data transmitter 10 only upon the occurrence of a data transmission request signal from the central location (not shown), which request signal is incapable of ringing telephone hand set 95 so as to create a false impression of a normal telephone call.

Selective ringing circuit 100 (see FIGURE 1*b*) is comprised of a series connected resistors 101 and 102 which shunt incoming telephone subscriber lines 93 and 94. A capacitor 104 has one of its terminals connected at the junction between resistors 101 and 102, while its other terminal is connected to line 94. A series circuit consisting of gaseous discharge lamp 96 and relay coil 97 is electrically connected in parallel with capacitor 104. The transmission request signal 120, with is a D.-C. voltage impressed upon the subscriber line 93–94 at time $t_0$, causes capacitor 104 to begin charging. At time $t_1$, the voltage across capacitor 104, as shown by wave form 121, reaches the value $$Vt_1=\frac{R_{102}}{R_{101}+R_{102}}E$$

where E equals the voltage impressed upon subscriber line 93–94. Discharge lamp 107 is designed to break down at the above voltage level $Vt_1$ causing solenoid 97 to become energized. Solenoid 97, when energized, closes its normally open contacts 97*a* (see FIGURE 1*a*) which are located between data transmitter 10 and B+ supply source for energizing data transmitter 10, as will be more fully described. It should be noted that the transmission request signal 120 is of such voltage amplitude and time duration or pulse width as to be clearly distinguishable from any cyclically varying wave form or spurious wave form which lack the pulse duration and voltage amplitude to energize solenoid 97 and thus erroneously energize transmitter 10. Resistors 101 and 102 are chosen so that they are of the order of ½ of a megohm, for example, so that their presence across subscriber line 93–94 does not load the line to any appreciable amount. Also, during the conduction of solenoid 97 and gaseous discharge lamp 96, ½ megohm is still present across the line so that the loading is still not appreciable, even during the appearance of the transmission request signal 120.

Upon successful completion of the transmission of the encoded data from data transmitter 10 to the output utilization device (not shown) located at the telephone central exchange, it is no longer necessary to have data transmitter 10 remain in its energized state.

The circuit arrangement for the deenergizing function as well as the energizing function can best be seen in FIGURE 1*a* which shows data transmitter 10 in schematic form. The electrical circuitry includes a positive voltage supply B+ which is connected to a fuse means 41 arranged to protect the circuitry from overload or fault current conditions. Two normally opened contact pairs 42*a* and 97*a* are electrically connected at node point 43 located at their upper terminals and likewise at node point 44 located at their lower terminals. Motor 18 has one of its terminals connected to node point 44, and its opposite terminal connected at node point 47 which is connected to ground potential 46 by means of lead 48. A second path in electrical parallel with the path containing motor 18 consists of resistor 45, conductive member 33, which is located on printed circuit board 11, and relay 42, which three members are permanently connected and are in parallel with motor 18 across node points 44 and 47. Arcuate segments 34 and 35 on printed circuit board 11 are electrically connected across the terminals of relay winding 42 by leads 49 and 50, respectively, for the purpose of deenergizing relay windings 42, as will be more fully described.

The energization of data transmitter 10 under control of selective ringing circuit 100 operates as follows:

A transmission request voltage signal 120 is impressed across the subscriber lines 93–94 at time $t_0$. As can be seen, the voltage drops develop across resistors 101 and 102 in proportion to the relative magnitude of their resistances. However, assuming the voltage across lines 93–94 was zero just prior to time $t_0$, which means that the voltage drop across resistors 101 and 102 is zero. Upon the occurrence of the voltage step from 0 (zero) volts to +E-volts, the entire voltage drop is developed across resistor 101, since the voltage across resistor 102 cannot change instantaneously due to the presence of capacitor 104, which is in parallel with resistor 102. The voltage across terminals 122 and 123 rises exponentially until it approaches the value $$Vt_1=\frac{R_{102}}{R_{101}+R_{102}}XE$$

which is the maximum voltage which can be developed across terminals 122 and 123.

The rise time $t_1-t_0$ is determined by the magnitudes of resistor 102 and capacitor 104. The characteristics of gaseous discharge lamp 96 are such that it will not become conductive until a predetermined critical voltage $Vt_1$ is reached. Upon the occurrence of this voltage, lamp 96 will break down completely acting as a short circuit until the voltage across the discharge lamp 96 is reduced to a level below that needed to sustain ionization of the glow discharge lamp 96.

The critical ignition voltage of lamp 96 is chosen so that it is within the approximate region of the voltage drop between terminals 122 and 123 at time $t_1$. Thus, at time $t_1$, glow discharge lamp 96 starts to conduct, causing a current to pass through relay winding 97. The current flowing through relay winding 97 is of sufficient magnitude to cause normally open contacts 97*a* to close (see FIGURE 1*a*).

Upon the closing of normally open contacts 97*a*, two parallel conductive paths in data transmitter 10 become energized. These paths are:

(a) B+ to fuse 41 through contacts 97*a* to motor 18 and lead 48 to ground potential 46.

(b) B+ to fuse 41 through contacts 97*a*, resistor 45, conductive segment 33, relay 42, and lead 48 to ground potential 46.

The impedance of the conductive paths are substantially equal in magnitude so that they draw currents of substantially equal magnitudes. The current drawn by the latter conductive path causes relay winding 42 to become energized sufficiently to close normally open contacts 42*a* (see FIGURE 1*a*), thus establishing a parallel conductive path across relay contacts 97*a*. At this instant, if contacts 97*a* were to become disengaged, relay 42 has already operated to close normally open contacts 42*a* so that data transmitter 10 remains in the energized state. The significance of the timing here is such that the input voltage pulse 120 must have a pulse width $t_2-t_0$ which is of sufficient duration so as to permit relay coil 97 to close normally open contacts 97*a* for a period which is sufficient to permit relay coil 42 to become energized. This having been done, pulse 120 is then stepped down to the 0 (zero) voltage level at time $t_2$.

The pulse duration $t_2-t_0$ of voltage pulse 120 also should be designed so that it does not have a pulse width which is great enough to permit selective ringing circuit 100 to oscillate. This occurs as follows:

When glow discharge lamp 96 starts to conduct, this effectively places a short circuit across parallel branches 102 and 104, causing the voltage between terminals 122 and 123 to drop substantially to zero volts. At this instant, glow discharge lamp 96 is cut off, enabling capacitor 104 to begin charging again. This cycle may become repetitive as long as the voltage level +E is impressed between line 93–94. Thus, it can be seen that the time constants in the input voltage pulse 120 should be selected so as to be of sufficient duration to permit contacts 42*a* to lock-in, and also to be short enough so as to prevent the oscillation described immediately above.

The energization of motor 18 initiates the rotation of rotary arm 17 in the clockwise direction, as shown by arrow 125 (see FIGURE 1*a*).

Relay coil 42 also closes a second pair of normally open contacts 42*b* (see FIGURE 1*d*), thus placing lead 130 which is electrically connected to line 94, into electrical contact with the multiple tone transmitter 140, thus placing both the transmitter portion 10 and the multiple tone generator 140 in the energized state ready for transmission of the encoded data.

The transmitter 10 is electrically connected to the multiple tone generator 140 in the following manner. Conductor segment 25 is electrically connected to the input 141 of multiple tone generator 140 by means of lead 141*a*. The conductive segments 21 in the track 20*a* are arranged so that each segment is adapted to receive one binary bit wherein a binary "one" is represented by a voltage level of B— or ground potential, while a binary "zero" is represented by +B or a positive D.-C. voltage potential such as, for example, +48 volts, which voltage level is quite prevalent in existing telephone networks. A character is comprised of seven consecutive segments 21. Printed circuit board 11 contains 84 segments 21, which number is sufficient for the transmission of 12 encoded characters.

It should be understood, however, that a greater or lesser number of characters may be employed. In the arrangement shown in FIGURE 1*a*, the first four characters are employed to identify the particular location or transmitter which is responding to the transmission request signal. Since this is a binary coded decimal arrangement, an identifying number consisting of four decimal digits permits a network which is comprised of 10,000 transmitters (i.e. 000 to 9999). It should be noted that this number is exactly equal to the maximum number of subscribers in a telephone central exchange. The remaining segments 22 which are available in track 20*a* are employed to transmit the encoded data which may be taken from analog-to-digital converters or a variety of other sources. Since the intelligence transmitted from a data transmitter to the central location varies each time the transmitter is requested to transmit, it should be understood that the manner in which these remaining segments 22 are connected to the encoding means is substantially different from the manner in which the segments comprising the first four characters are wired.

Since the identifying number remains the same regardless of when transmission takes place, the segments of these four decimal characters are permanently wired to a B— source, as is shown in FIGURE 1*a*. The code arrangement which is employed is a two-out-of-five code which is used because of its inherent self-checking feature. The bit positions of the characters 1 through 4 represent the decimal numbers 0, 1, 2, 3, 6, "Amb" and "S" where the "S" segment will be more fully described later. It should be understood, however, that other coding arrangements may be transmitted with the instant invention and the coding arrangement set forth herein is merely exemplary.

The segments 21 of the decimal characters numbered 1 through 4 are wired to the B— voltage source by means of conductor 171 to form the address word "1961." When the rotary arm 17 begins its rotation, wherein the beginning point of rotation is a position which is 180° behind the dotted position of rotary arm 17 shown in FIGURE 1*a*, the rotary arm comes into engagement with the left-handmost segment 21 of the segment 21' of track 20*a* and a conductive path at this instant is established from B— through conductor 171, "0" segment 211 to sensing member 19*a* of rotary arm 17 (see FIGURE 1*d*), through conductor 80 to sensing member 19*e*, through conductor segment 25 to lead 141*a* which is connected to the input terminal 141 of multiple tone generator 140 (see FIGURE 1*b*). This B— potential causes the transistor 142 to multiple tone generator 140 to become conductive, as will be more fully described. As the rotary arm 17 comes into engagement with subsequent conductive segments 21 which are not electrically connected to the B— voltage source, then no B— potential is impressed upon the input terminal 141 of tone generator 140, so that transistor 142 does not conduct under these circumstances.

Multiple tone generator 140 is comprised of a PNP transistor 143 whose base electrode 144 is electrically connected to input terminal 141, which in turn, is connected to conductive segment 25 (see FIGURE 1*a*) by means of leads 141 and 141*a*, as described previously. A voltage divider network consisting of a positive D.C. source, resistors 180 and 181 and B—, acts to bias transistor 143 into cutoff in the absence of an input signal at input terminal 141 of the proper magnitude and polarity. The collector electrode 146 is connected to one end of an inductance 151, the other end of which is electrically connected to normally open contact pair 42*b* by means of lead 167. The other side of contact pair 42*b* is electrically connected to subscriber line 94 through lead 130. The emitter 145 of transistor 143 is electrically connected to resistor 147, which, in turn, is connected to subscriber line 93 through the series path of resistor 165 and conductor 166. Capacitors 149 and 150 are connected in series at terminal 168, and the series connected capacitors are connected in parallel across inductance 151, the parallel combination forming a tuned circuit. A portion of the energy developed by the tuned circuit is fed back to the emitter 145 of transistor 143 by means of lead 169. Series connected resistors 152 and 153 are connected between point 170 and conductor 166 to serve as a voltage divider for capacitor 148 which is connected to point 155 by conductor 156 to point 168 by conductor 169 and to emitter 145 by conductor 145*a*. The series connected resistor 152 and capacitor 148 are connected in parallel across capacitor 149, as can be seen clearly in FIGURE 1*b*, serving to alter the frequency response of the tuned circuit consisting of inductor 151 and capacitors 149 and 150. Connected to lead 157, which is directly connected to collector 146 of the transistor 143, are a plurality of capacitors 158 through 164. The opposite terminals 158*a* through 164*a* of capacitors 158 through 164, respectively, are electrically connected to associated segments 22 on track 20*b* of the data transmitter 10 (see FIGURE 1*a*), by means of conductors 158*b* through 164*b*, respectively. As can be seen in FIGURE 1*a*, every eighth conductor segment 22 is connected in parallel to an associated conductor 158*b* through 164*b* for a purpose to be more fully described. It should be noted that the conductors 158*b* through 164*b* normally completely surround the track 20*b*, but only a few connections are shown for the sake of clarity.

The operation of the data transmitter-tone generator combination (see FIGURES 1*a* and 1*b*) is as follows:

The energization of the transmitter 10 occurs as previously described wherein a transmission request wave form 120 is impressed upon subscriber line 93–94 (see FIGURE 1*b*) causing relay coil 97 to become energized, thus closing normally open contacts 97*a* (see FIGURE 1*a*). The closure of contacts 97*a* energizes relay 42, as previously described, which, in turn, closes normally open contacts 42*a* thus locking data transmitter 10 in the energized state.

The conductive path from B+ to ground 46 through motor 18 is completed by the closure of the contacts 97*a* and 42*a*, thereby energizing motor 18 causing rotary arm 17 to be rotated about the axis of shaft 16. Rotary arm 17 begins rotation from the starting position 168 (see FIGURE 1*a*) which is the normal rest position for rotary arm 17. The rotation of arm 17 is in the clockwise direction, as shown by arrow 125.

At this instant, the energization of relay 42 causes the closing of normally open contacts 42*b* in readiness for energization by the data transmitter. As the rotary arm 17 begins its clockwise rotation, it first comes into angular alignment with segment 165*a* which is located in track 20*a*. Segment 165*a* is connected to the B— source by means of conductor 169.

As rotary arm 17 moves into angular alignment with segment 25 located in track 20*e* and segment 165 located in track 20*a*, sensing members 19*a* and 19*e* come into engagement with segments 165 and 170, respectively, thus completing a conductive path which extends from B— through lead 169, segment 165, sensing member 19*a* of rotary arm 17 (see FIGURE 1*c*), conductor 80 to sensing member 19*e*, conductive segment 25 through conductor 141*a* to input terminal 141 of oscillator 140 (see FIGURE 1*b*) which places B— at base terminal 141 (see FIGURE 1*b*) of the multiple tone generator 140 driving transistor 143 into conduction. Simultaneously therewith, arm 17 is in angular alignment with arcuate segment 24 of track 20*d* and conductive segment 170 of track 20*c*, establishing a current path from B— through conductor 172, arcuate segment 24 of track 20*d*, sensing member 19*d* of arm 19, conductor 86, sensing member 19*c*, contact 170, conductor 166 to terminal 164*a* of capacitor 164. This operation places terminal 164*a* at the same potential as terminal 170 of the tone generator, thus placing capacitor 164 in parallel with capacitors 149 and 150, resulting in the formation of a tuned circuit of a predetermined frequency, which frequency is determined by the values of inductance 151, parallel capacitor arrangement 149 and 148 and capacitors 150 and 164 which are connected in series with the parallel capacitor arrangement 149 and 148. This frequency is impressed across subscriber lines 93–94 by means of conductors 130 and resistor 165, respectively. This frequency immediately apprises the receiver facility that the data transmitter 10 has received the transmit-request signal, has become energized, and is about to initiate transmission. In addition the frequency transmitted is selected to be of such a value as to notify the receiving facility of the length of time needed by the data transmitter for transmitting its complete message, which feature will be more fully described.

As the rotary arm 17 continues its clockwise rotation, it next comes into angular alignment with the first segment 21' of track 20*a* and the conductive path at this time consists of B— through lead 171 to the "zero" segment 21' of track 20*a* through sensing member 19*a* (see FIGURE 1*c*) of rotary arm 17, conductor 80 to sensing member 19*e*, conductive segment 25 through lead 141*a* to the input terminal 141 of tone generator 140 (see FIGURE 1*b*) which is connected to the base electrode 144 of transistor 143. The impression of a B— potential on the base of transistor 144 places the transistor 143 in the conductive state.

At the same instant, a second conductive path exists from B— through lead 172 to conductive segment 24 of track 20*d*, sensing member 19*d* of rotary arm 17 (see FIGURE 1*c*), conductor 86 to sensing member 19*b*, segment 22*a* of track 20*b* to conductor 158*b* which is electrically connected to terminal 158*a* of capacitor 158 (see FIGURE 1*b*). This places a B— potential on capacitor 158, thus placing capacitor 158 in parallel with series connected capacitors 149 and 150 across the terminals 157 and 170. The inclusion of capacitor 158 across the series connected capacitors 149 and 150 again alters the frequency of the tuned circuit to a frequency which is clearly distinguishable from the answer-back frequency which was generated by the placement of capacitor 148 across the terminals 170 and 168, as was described previously when rotary arm 17 came into angular alignment with conductive segments 165 and 170.

Thus, at this instant, transistor 143 is in the conductive state and is generating a frequency which is determined by the tuned circuit consisting of inductance 151, capacitors 149 and 150 and capacitor 158. This frequency is transmitted across subscriber lines 93–94, as was previously described. The conductive path which includes segments 23 of track 20*c* plays no part in the transmission of the transmitter identifying code, and description of this will be reserved at this point.

As the rotary arm 17 continues its clockwise rotation, it comes into angular alignment with segment 21 (which receives the binary state of the decimal "1" position) and the associated segments of the other tracks to establish a conductive path from B—, conductor 171, segment 21', sensing member 19*a* of rotary arm 17 (see FIGURE 1*c*), conductor 80, sensing member 19*e* to conductive segment 25 of track 20*e*, conductor 141*a* to input terminal 141 to tone generator 140 (see FIGURE 1*b*). Again, it can clearly be seen that B— is applied to the base 144 of transistor 143, placing the transistor in the conductive state.

A second conductive path at this instant extends from B— through conductor 172, conductive segment 24 of track 20*d*, sensing member 19*d* of rotary arm 17, conductor 86, sensing member 19*b*, and segment 22 "B" of track 20*b*, conductor 159*b* to terminal 159*a* of capacitor 159. This conductive path places capacitor 159 in parallel with the the series connected capacitors 149 and 150. It should be noted here that the capacitors 158 through 164 differ each from the other in their impedance values. This being true, the impression of capacitor 159 into the tuned circuit changes the frequency of the tuned circuit, which frequency is then transmitted through subscriber line 93–94, as was previously described. It should be noted that only one of the capacitors 158 through 164 is connected to B— at any given instant.

Rotary arm 17 sweeps the subsequent radially aligned segments of tracks 20*a* through 20*e* in the same manner as described with respect to the first two binary bit positions described immediately above. It can, therefore, be seen that the segments 22A through 22G of track 20*b* of the data transmitter are each electrically connected to the capacitors 158 through 164, which capacitors have impedance values differing each from the other. As one typical example, a highly successful tone generator which we have operated, generated frequencies from 425 cycles per second with capacitor 158 in the circuit to 1625 cycles per second with capacitor 164 connected across the tuned circuit, whereby each frequency generated by switching each capacitor 158–164 into the turned circuit was a 200 cycle increase over the previous capacitor throughout the rotation of rotary arm sensing member 19*b* with conductive segments 22A through 22G. The answer-back frequency generated when sensing member 19*a* comes into engagement with conductive member 165 of track 20*a* and sensing member 19*e* comes into engagement with conductive segment 170 of track 20*e* has been set at 2500 cycles per second. It should be understood that the frequencies selected here are merely exemplary, and any frequency range that is desired may be employed in the tone generator 140.

When the rotary arm 17 comes into angular alignment with segments 21''' of track 20*a* (which receives the binary state of the decimal "2" position), it can be seen that no electrical connection exists between B— and this segment 20''' so that transistor 143 is not driven into the conductive state. Therefore, even though capacitor 160 is placed in parallel across series connected capacitors 149 and 150, in a manner which was previously described, the tone generator 140 does not transmit any frequency whatsoever due to its deenergized condition. Thus it can be seen that tone generator performs amplitude and frequency modulation before introducing the signals into the communication link.

It should, therefore, be noted that the presence of a frequency denotes the presence of a binary "one," while the absence of any one of the specified frequencies denotes a binary "zero." Since each frequency generated by the sequential inclusion capacitors 158 through 164 differs from the other frequencies generated by the inclusion of capacitors 158 through 164, each frequency or tone is thus specifically identified with one specific binary bit position. Thus, for example, the 425 cycle per second tone generated when capacitor 158 is inserted into the turned circuit denotes the decimal "zero" position of the binary coded word; the 625 cycle per second frequency denotes the decimal "one" bit position of the binary coded word, and so forth, throughout the remainder of the character. The capactor 164 of tone generator 140 which is electrically connected to the "S" segment 21 of track 20*a* is employed for the purpose of generating an end-of-character tone. This tone is a 1625 cycle per second tone which apprises the receiver facility of the completion of transmission of the binary coded character. As can clearly be seen, this multiple tone transmission arrangement greatly simplies the design of the receiver facility, since each binary bit position is represented by a frequency which is easily distinguished from the frequencies of the remaining binary bit positions of the binary coded character.

Although the embodiment described herein employs a two-out-of-five code arrangement, it should be understood that the transmitter may operate just as well with any other binary arrangement such as a three-out-of-five code binary coded decimal, and so forth.

Figure 2:
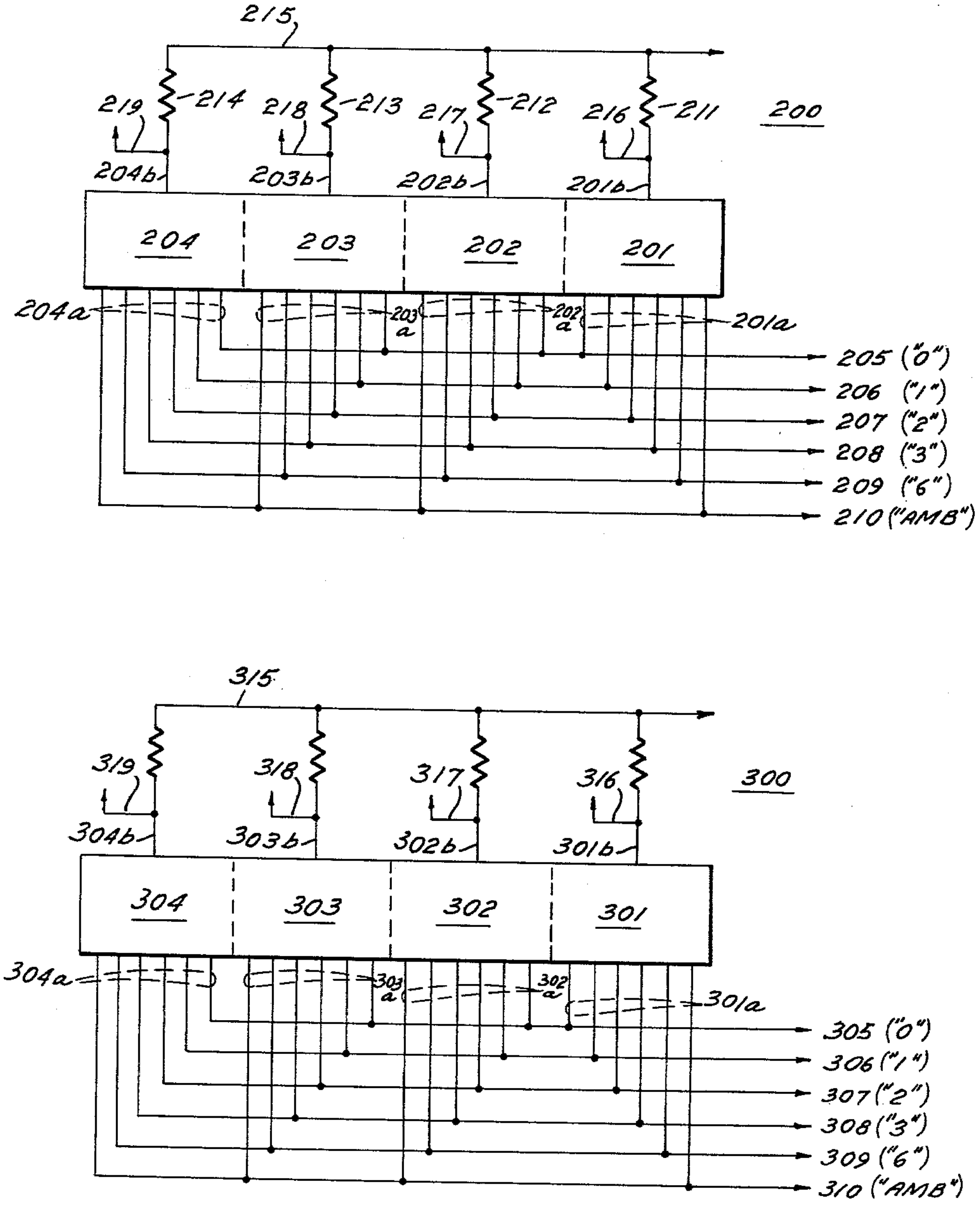
FIGURE 2 is a block diagram of one type of encoder which may be employed with our novel data transmitter.

One type of analog-to-digital encoder which may be employed in combination with our novel data transmitter is shown in FIGURE 2, wherein encoders 200 and 300 are identical in every respect. The encoder arrangement 200 is comprised of four shaft angle encoders 201 through 204, each being of the type described in U.S. application Serial No. 125,247, filed July 19, 1961 entitled "Code Stack," previously mentioned. Basically, the encoder consists of an arrangement whereby the angular position of a rotatable shaft is converted into a six bit binary code which represents, in binary fashion, the angular position of the rotatable shaft at the instant that transmission takes place. Each encoder is provided with a common lead 201*b* through 204*b*, respectively, which is connectable to a voltage source, as will be more fully described. The common conductor is connected to a plurality of output leads 201*a* through 204*a* of the associated encoder 201 through 204 respectively, the code generated being dependent strictly upon the angular position of the associated encoder rotatable shaft (not shown). Thus, a binary code of six bit length is generated by each encoder 201 through 204, which code represents the angular position of the encoder rotatable shaft (not shown). The code employed here is a two-out-of-five—three-out-of-five code which is more fully described in aforementioned U.S. application Serial No. 125,247 and since the code lends no novelty to the data transmitter of this invention, the description of the code set forth in aforementioned U.S. application Serial No. 125,247 is incorporated herein by reference. The conductors 205 through 210 electrically connect the associated binary bit position conductors of each encoder 201 through 204 in a parallel arrangement, as can be clearly seen in FIGURE 2, for a reason to be more fully described.

The common terminals 201*b* through 204*b* of encoders 201 through 204 are connected in parallel to conductor 215 through resistors 211 through 214, respectively. Conductor 215 is electrically connected to line 93 of subscribed line 93–94 by means of conductor 215*a* (see FIGURE 1*b*). Taking line 93 of subscriber line 93–94 as the B+ side of the subscriber line, it can be seen that the common leads 201*b* through 204*b* of encoders 201 through 204 are all approximately at the B+ voltage level. Leads 216 through 219 of encoders 201 through 204, respectively, electrically connect the common terminals 201*b* through 204*b*, respectively to arcuate conductive segments 231 through 234 located in track 20*a* of data transmitter 10 (see FIGURE 1*a*). Each encoder 201 through 204, respectively, generates a binary coded decimal character so that the four encoders 201–204 considered collectively are capable of forming any decimal number from 0000 to 9999. It should be understood that other encoders may be added to the encoder group 200 to form decimal numbers having greater than four decimal positions, since this is a mere design factor capable of one with ordinary skill in the art.

The operation of the data transmitter in combination with the encoder groups 200 and 300 is as follows:

Immediately after the transmission of the four binary coded characters of the identification word of data transmitter 10 (see FIGURE 1*a*), rotary arm 17 moves clockwise to the position shown by the arrow 230, coming into angular alignment with the associated segments of tracks 20*a* through 20*e*. A plurality of conductive paths are completed at this time, these paths being:

(a) Encoder 204 through conductor 205, conductor 205*a* to segment 21 "0," sensing member 19*a* of rotary arm 17 (see FIGURE 1*c*), conductor 80, sensing member 19*e*, segment 25 of track 20*e* to conductor 140*a* to input terminal 141 of tone generator 140 (see FIGURE 1*b*).

(b) B− through conductor 172 to conductive segment 24 of track 20*d*, sensing member 19*d* of rotary arm 17 (see FIGURE 1*c*), conductor 86 to sensing member 19*b*, conductive segment 235 of track 20*b* to conductor 158*b* to terminal 158*a* of capacitor 158 (see FIGURE 1*b*), thus conditioning the tone generator 140 at this instant for the transmission of a 425 cycle per second tone (for example) through subscriber line 93–94.

(c) A third conductive path extends from B− potential through conductor 172 to segment 24 of track 20*d* of data transmitter 10, sensing member 19*d* of rotary arm 17 (see FIGURE 1*c*), conductor 86, sensing member 19*c* to arcuate segment 231, conductor 236 to conductor 219 which is connected to the common terminal 204*b* of encoder 204 (see FIGURE 2).

Thus, it can be seen at this instant that the binary condition of the decimal "zero" bit position of the first binary coded character from shaft encoder 204 is connected to the input terminal 241 of multiple generator 140, and, depending upon whether the binary state of this decimal position is a "zero" or a binary "one" transistor 143 will be in the conductive or non-conductive state, respectively. Also at this instant encoders 201 through 203 have their common terminals 201*b* through 203*b*, respectively, at approximately the B+ potential, whereas common terminal 204*b* is at the B− potential, due to the engagement of sensing member 19*c* of rotary arm 17 with arcuate segment 231 of track 20*c*. Thus, only one of the angular position encoders 201 through 204 is at the B− potential which B− potential is impressed upon the parallel leads 205 through 210, via the leads 204*a* of encoder 204. This third conductive paths, therefore, makes available a B− potential to the common lead of only one position encoder at a time, which B− potential is impressed upon the binary bit positions of the data transmitter for that particular binary coded character wherein the binary state of those decimal digit positions is dependent only upon the angular position of the rotatable shaft being measured.

The width of the arcuate segment 231 is designed so that the associated sensing member 19*c* of rotary arm 17 (see FIGURE 1*c*) remains in engagement with this arcuate segment 231 until all of the segments 21—0.1, 2, 3, 6 Amb and S of the first binary code character have been swept by sensing member 19*a* of rotary arm 17.

It can be seen from FIGURE 1*a* that an "S" segment immediately follows the six segments 0, 1, 2, 3, 6, and Amb which receive the six binary positions from the encoder 204 which "S" segment is employed as the end-of-character segment. This segment is electrically connected to conductor 171 and operates to place capacitor 164 of tone generator 140 (see FIGURE 1*d*) across the series connected capacitors 149 and 150, causing the tone generator 140 to transmit a 1625 cycle per second tone (for example) which is recognizable at the receiving facility as an end-of-character tone.

Thus, it can be seen that although the associated binary bit positions of the position encoders 201 through 204 are each connected in parallel by means of leads 205 through 210, only one encoder is at the B− voltage level at any given instant during the transmission period, so that only six conductors 205 through 210 are needed between the encoder group 200 and the 24 segments on switching circuit board 11 located in track 20*a* which are adapted to receive the binary information from the encoders 201 through 204. This permits the encoder group 200 to be internally wired with associated binary bit output positions 201*a*–204*a* connected in parallel, as shown in FIGURE 2, prior to connecting encoder group 200 with the transmitter 10 of FIGURE 1*a*, thus greatly reducing the wires which must be strung between the data transmitter 10 and encoder group 200. It should be noted, of course, that four additional leads 216 through 219, which are connected to the common leads 201*b* through 204*b* of the encoders 201 through 204 (see FIGURE 2), must be connected between arcuate segments 231 through 234 of data transmitter 10, but the overall number of leads required between the data transmitter and the encoder group is 11, whereas, without the arrangement of track 20*c*, a total of 24 wires must be strung between the data transmitter and the encoder group.

It should be understood that encoder group 300 operates in the same manner as encoder group 200, and is wired in such a way as to occupy the remaining radially aligned segments 21 of track 20*a* of the data transmitter 10. The leads 319 through 316 are accordingly connected to the leads 240 through 243 of arcuate segments 244 through 247, respectively, which are located in track 20*c* of the data transmitter 10 shown in FIGURE 1*a*. It should be understood that encoder group 300 operates in exactly the same manner as encoder group 200, and that parallel leads 305 through 310 are likewise connected to parallel leads 205*a* through 210*a* so that the only additional conductors which are required to be strung between encoder group 300 and data transmitter 10 are the conductors 319 through 316. Thus a total of only 15 wires need be strung between the eight encoders 201–204 and 301–304 whereas 48 wires would be required without this arrangement.

As rotary arm 17 comes into radial alignment with arrow 250 during its clockwise rotation, sensing members **19*c* of rotary arm 17 engages arcuate segment 34 of track 20*c*, while, at the same instant, sensing member 19*d* engages arcuate segment 35 of track 20*d*, thus establishing a conductive path from conductor segment 33, conductor 50, conductive segment 35, sensing member 19*d* or rotary arm 17** (see FIGURE 1*c*), conductor 86, sensing member **19*c*, conductive segment 34 of track 20*c*, conductor 49 to terminal 47. This conductive path shunts relay 42 causing it to deenergize, thus causing normally open contacts 42*a* to return to their normally open state resulting in deenergization of motor 18 which causes rotary arm 17 to come to rest approximately at the starting position 168. The deenergization of relay 42 also causes normally open contacts 42*b*** (see FIGURE 1*b*) to return to their normally open state, thus disconnecting multiple tone generator 140 from subscriber line 93–94. It can thus be seen that the transmitter, upon completion of the 360° sweep which it traverses, automatically deenergizes itself, returning the rotary arm 17 to the starting position 168 in readiness for subsequent intelligence transmission.

Figure 3:
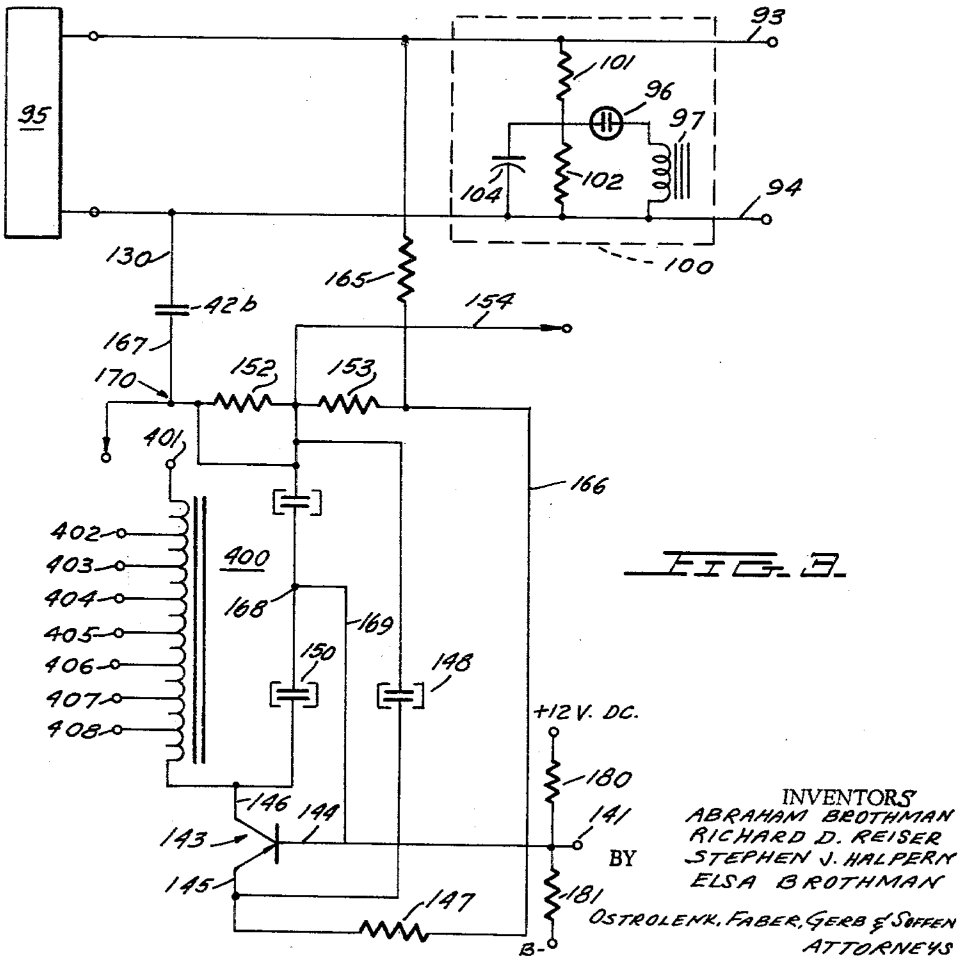
FIGURE 3 is a schematic diagram of another preferred embodiment of the tone generator shown in FIGURE 1*b*.

Another preferred embodiment of tone transmitter 140 is shown in FIGURE 3 wherein the battery of capacitors 158–164 are replaced by a multi-tap inductance 400 having taps 401–408 which are connected to conductors **158*b* through 164*b*** (see FIGURE 1*a*) in the same manner as were capacitors 158 through 164, for the purpose of altering the frequency of the tuned circuit comprising inductance 400 and series connected capacitors 149 and 150.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

We claim:

1. For use in parallel connection with a telephone handset normally energized by a cyclically varying waveform transmitter means comprising first means having a plurality of input terminals for receiving a plurality of binary signals, oscillator means for generating a plurality of frequencies, third means operatively associated with said first means for keying the amplitude of the oscillator output signal in response to said binary signals, said oscillator means including a plurality of impedance means, bias means; fourth means for connecting each of said impedance means to said bias means in serial fashion; the impedance of each of said impedance means engageable with said bias means being different from each other for controlling the frequency generated by said oscillator means, fifth means responsive to a transmission request signal for momentarily energizing said transmitter means, holding means responsive to said momentary energization for retaining said data transmitter means in the energized state during the transmission period, said transmission request signal being a voltage square pulse energizing only said data transmitter.

2. For use in parallel connection with a telephone handset normally energized by a cyclically varying waveform transmitter means comprising first means having a plurality of input terminals for receiving a plurality of binary signals, oscillator means for generating a plurality of frequencies, third means operatively associated with said first means for keying the amplitude of the oscillator output signal in response to said binary signals, said oscillator means including a plurality of impedance means, bias means; fourth means for connecting each of said impedance means to said bias means in serial fashion; the impedance of each of said impedance means engageable with said bias means being different from each other for controlling the frequency generated by said oscillator means, fifth means responsive to a transmission request signal for momentarily energizing said transmitter means, said transmission request signal being a voltage square pulse energizing only said data transmitter, holding means responsive to said momentary energization for regaining said data transmitter means in the energized state during the transmission period, seventh means responsive to the termination of said transmission period for deenergizing said data transmitter in readiness for a subsequent transmission request signal.

3. For use in a communications system, a transmitter comprising first means having a plurality of terminals for receiving a predetermined plurality of groups of binary signals, second means operatively associated with said first means for serially engaging the terminals of said first means; oscillator means responsive to said second means for generating an output signal, the amplitude of said output signal being functionally related to said binary serial input signals; third means responsive to a transmission request signal for momentarily energizing said transmitter, said transmission request signal being a voltage square pulse energizing only said data transmitter, holding means responsive to energization of the transmitter means for retaining said transmitter in the energized state.

4. For use in a communications system, a transmitter comprising first means having a plurality of terminals for receiving a predetermined plurality of groups of binary signals, second means operatively associated with said first means for serially engaging the terminals of said first means; oscillator means responsive to said second means for generating an output signal, the amplitude of said output signal being functionally related to said binary serial input signals; third means responsive to a transmission request signal for momentarily energizing said transmitter, said transmission request signal being a voltage square pulse energizing only said data transmitter, holding means responsive to energization of the transmitter means for retaining said transmitter in the energized state, said holding means including connecting means for establishing a communication link between said transmitter and said communication system.

5. A communications system for use in an existing subscriber telephone network which employs a cyclically varying waveform as a ringing signal comprising a transmitter having first means for receiving a predetermined plurality of groups of binary coded signals, second means operatively associated with said first means for transmitting said binary signals in serial fashion, third means for simultaneously frequency modulating said binary output signals transmitted by said second means, said third means being adapted to alter the frequency of the output signal upon the occurrence of each binary signal impressed upon the input terminal of said first means, fourth means responsive to a transmission request signal for momentarily energizing said transmitter; said transmission request signal being a square pulse of predetermined amplitude and pulse duration; means energized by said transmission request signal for transmitting the identifying code of said transmitter.

6. A communications system for use in an existing subscriber telephone network which employs a cyclically varying waveform as a ringing signal comprising a transmitter having first means for receiving a predetermined plurality of groups of binary coded signals, second means operatively associated wtih said first means for transmitting said binary signals in serial fashion, third means for simultaneously frequency modulating said binary output signals transmitted by said second means, said third means being adapted to alter the frequency of the output signal upon the occurrence of each binary signal impressed upon the input terminal of said first means, fourth means responsive to a transmission request signal for momentarily energizing said transmitter; said transmission request signal being a square pulse of predetermined amplitude and pulse duration; holding means responsive to momentary energization of said transmitter for retaining said transmitter in the energized state; means energized by said transmission request signal for transmitting the identifying code of said transmitter.

7. A communications system for use in an existing subscriber telephone network which employs a cyclically varying waveform as a ringing signal comprising a transmitter having first means for receiving a predetermined plurality of groups of binary coded signals, second means operatively associated with said first means for transmitting said binary signals in serial fashion, third means for frequency modulating said binary output signals transmitted by said second means, said third means being adapted to alter the frequency of the output signal upon the occurrence of each binary signal impressed upon the input terminal of said first means, fourth means responsive to a transmission request signal for momentarily energizing said transmitter; said transmission request signal being a square pulse of predetermined amplitude and pulse duration; means energized by said transmission request signal for transmitting the identifying code of said transmitter; holding means responsive to momentary energization of said transmitter for retaining said transmitter in the energized state, said holding means including timing means for deenergizing said transmitter upon completion of the data transmission operation.

8. A communications system for use in an existing subscriber telephone network which employs a cyclically varying waveform as a ringing signal comprising a transmitter having first means for receiving a predetermined plurality of groups of binary coded signals, second means operatively associated with said first means for transmitting said binary signals in serial fashion, third means for frequency modulating said binary output signals transmitted by said second means, said third means being adapted to alter the frequency of the output signal upon the occurrence of each binary signal impressed upon the input terminal of said first means, fourth means responsive to a transmission request signal for momentarily energizing said transmitter; said transmission request signal being a square pulse of predetermined amplitude and pulse duration; means energized by said transmission request signal for transmitting the identifying code of said transmitter; holding means responsive to momentary energization of said transmitter for retaining said transmitter in the energized state, said fourth means further including answer-back means for generating an answer-back tone to indicate that the transmitter is in the energized state.

9. A communications system for use in a subscriber telephone network which employs a cyclically varying waveform as a ringing signal comprising a transmitter including first means for receiving a predetermined plurality of groups of binary coded signals, second means cooperatively associated with said first means for transmitting said binary signals in serial fashion, third means for frequency modulating the serially transmitted binary signals for effecting synchronism of the system with said transmitter, fourth means responsive to a transmission request signal for momentarily energizing said transmitter, said transmission request signal being a square pulse of predetermined amplitude and pulse duration; means energized by said transmission request signal for transmitting the identifying code of said transmitter; holding means responsive to the momentary energization of said transmitter for retaining said transmitter in the energized state, said holding means including timing means for deenergizing said transmitter upon completion of the data transmission operation, said second means comprising a rotatable arm for sequentially engaging the first means, said third means including a tone generator and a plurality of impedance means each being intermittently engageable with said rotatable arm for controlling the output frequency of said tone generator.

10. For use in an existing telephone subscriber network having telephone handsets, transmitter means for generating binary coded information for a subscriber location to a central location comprising bias means; a first arcuate array of at least one group of conductive segments; oscillator means having an input terminal and a plurality of different valued impedance elements selectively connected to associated segments of said one group of the first array; a second arcuate array of at least one conductive segment connected to said bias means; rotary means for sweeping said first and second arrays including first means to sequentially connect said impedance means into said oscillator means to alter the output frequency thereof; a third arcuate array of at least one group of conductive segments for receiving binary information represented by two distinct voltage levels; a fourth arcuate array of at least one segment connected to said input terminal; said rotary means including second means for sweeping said third and fourth arrays to selectively energize and deenergize said oscillator means in accordance with the binary information.

11. For use in an existing telephone subscriber network having telephone handsets, transmitter means for generating binary coded information for a subscriber location to a central location comprising bias means; a first arcuate array of at least one group of conductive segments; oscillator means having an input terminal and a plurality of different valued impedance elements selectively connected to associated segments of said one group of the first array, a second arcuate array of at least one conductive segment connected to said bias means; rotary means for sweeping said first and second arrays including first means to sequentially connect said impedance means into said oscillator means to alter the output frequency thereof; a third arcuate array of at least one group of conductive segments for receiving binary information represented by two distinct voltage levels; a fourth arcuate array of at least one segment connected to said input terminal; said rotary means including second means for sweeping said third and fourth arrays to selectively energize and deenergize said oscillator means in accordance with the binary information; motor means for rotating said rotary means; a selective ringing circuit responsive to a square voltage pulse for energizing said motor means; holding means connected to said motor means for holding said motor means in the energized state after termination of the square voltage pulse; said square voltage pulse being a signal different from that employed in ringing a telephone.

12. For use in an existing telephone subscriber network having telephone handsets, transmitter means for generating binary coded information for a subscriber location to a central location comprising bias means; a first arcuate array of at least one group of conductive segments; oscillator means having an input terminal and a plurality of different valued impedance elements selectively connected to associated segments of said one group of the first array; a second arcuate array of at least one conductive segment connected to said bias means; rotary means for sweeping said first and second arrays including first means to sequentially connect said impedance means into said oscillator means to alter the output frequency thereof; a third arcuate array of at least one group of conductive segments for receiving binary information represented by two distinct voltage levels; a fourth arcuate array of at least one segment connected to said input terminal; said rotary means including second means for sweeping said third and fourth arrays to selectively energize and deenergize said oscillator means in accordance with the binary information; motor means for rotating said rotary means; a selective ringing circuit responsive to a square voltage pulse for energizing said motor means; holding means connected to said motor means for holding said motor means in the energized state after termination of the square voltage pulse; said square voltage pulse being a signal different from that employed in ringing a telephone; additional first and second segments in said second and third arrays respectively connected to opposite terminals of said motor means; said rotary means including third means for sweeping said first and second segments to shunt said motor means and said holding means to deenergize said transmitter means when said binary information has been transmitted.

13. For use in an existing telephone subscriber network having telephone handsets, transmitter means for generating binary coded information for a subscriber location to a central location comprising bias means; a first arcuate array of at least one group of conductive segments; oscillator means having an input terminal and a plurality of different valued impedance elements selectivey connected to associated segments of said one group of the first array; a second arcuate array of at least one conductive segment connected to said bias means; rotary means for sweeping said first and second arrays including first means to sequentially connect said impedance means into said oscillator means to alter the output frequency thereof; a third arcuate array of at least one group of conductive segments for receiving binary information represented by two distinct voltage levels; a fourth arcuate array of at least one segment connected to said input terminal; said rotary means including second means for sweeping said third and fourth arrays to selectively energize and deenergize said oscillator means in accordance with the binary information; motor means for rotating said rotary means; a selective ringing circuit responsive to a square voltage pulse for energizing said motor means; holding means connected to said motor means for holding said motor means in the energized state after termination of the square voltage pulse; said square voltage pulse being a signal different from that employed in ringing a telephone; additional first and second segments in said second and third arrays respectively connected to opposite terminals of said motor means; said rotary means including third means for sweep-said first and second segments to shunt said motor means and said holding means to deenergize said transmitter means when said binary information has been transmitted; said selective ringing circuit comprising capacitor means; series connected neon glow tube and relay means connected in parallel with said capacitor means for energizing said motors upon receipt of a transmit request square pulse.

References Cited by the Examiner

UNITED STATES PATENTS

| | | | |
|---|---|---|---|
| 1,889,597 | 11/32 | FitzGerald | 179—2 |
| 2,532,455 | 12/50 | MacSorley | 331—179 |
| 2,735,940 | 2/56 | Norby | 178—66 |
| 2,815,400 | 12/57 | Poylo | 179—2 |
| 2,957,046 | 10/60 | Freeman | 179—2 |
| 2,967,234 | 1/61 | Piazza | 325—30 |
| 3,037,190 | 5/62 | Herbst | 178—50 |
| 3,104,382 | 9/63 | Morgan | 340—204 |

DAVID G. REDINBAUGH, *Primary Examiner.*